United States Patent
Kwon et al.

(10) Patent No.: US 11,894,197 B2
(45) Date of Patent: Feb. 6, 2024

(54) MULTILAYER CERAMIC CAPACITOR

(71) Applicant: SAMSUNG ELECTRO-MECHANICS CO., LTD., Suwon-si (KR)

(72) Inventors: Byeong Chan Kwon, Suwon-si (KR); Ki Pyo Hong, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 210 days.

(21) Appl. No.: 17/487,441

(22) Filed: Sep. 28, 2021

(65) Prior Publication Data

US 2022/0148811 A1 May 12, 2022

(30) Foreign Application Priority Data

Nov. 10, 2020 (KR) .................. 10-2020-0149551

(51) Int. Cl.
*H01G 4/30* (2006.01)
*H01G 4/224* (2006.01)
*H01G 4/12* (2006.01)
*H01G 4/008* (2006.01)
*H01G 4/012* (2006.01)

(52) U.S. Cl.
CPC .......... *H01G 4/30* (2013.01); *H01G 4/008* (2013.01); *H01G 4/012* (2013.01); *H01G 4/12* (2013.01); *H01G 4/224* (2013.01)

(58) Field of Classification Search
CPC .......... H01G 4/008; H01G 4/012; H01G 4/12; H01G 4/224; H01G 4/30
See application file for complete search history.

(56) References Cited

U.S. PATENT DOCUMENTS

| 9,812,260 | B2* | 11/2017 | Fukunaga | H01G 4/248 |
| 9,984,824 | B2* | 5/2018 | Tanaka | H01G 4/005 |
| 10,020,117 | B2* | 7/2018 | Mizuno | H01G 4/232 |
| 10,153,091 | B2* | 12/2018 | Kowase | H01G 4/30 |
| 2013/0208399 | A1* | 8/2013 | Morita | H01G 4/30 361/301.4 |

(Continued)

FOREIGN PATENT DOCUMENTS

| JP | S64-009607 A | 1/1989 |
| JP | H09-320887 A | 12/1997 |
| JP | 2017-011172 A | 1/2017 |

*Primary Examiner* — Nathan Milakovich
(74) *Attorney, Agent, or Firm* — Morgan, Lewis & Bockius LLP

(57) ABSTRACT

A multilayer ceramic capacitor includes a ceramic body including a dielectric layer, a first internal electrode and a second internal electrode, disposed to oppose each other with the dielectric layer interposed therebetween, and a first external electrode and a second external electrode. The ceramic body further includes first and second margin portions and first and second cover portions, disposed on upper and lower surfaces of a capacitance formation portion and the first and second margin portions, respectively. The first and second cover portions each include a first cover layer adjacent to an internal electrode, disposed on an outermost side among the first and second internal electrodes, and a second cover layer disposed on the first cover layer, and an interface at which the first cover layer and the second cover layer are in contact with each other.

23 Claims, 11 Drawing Sheets

(56) References Cited

U.S. PATENT DOCUMENTS

2018/0174755 A1\* 6/2018 Kim ................. H01G 4/248
2020/0105471 A1\* 4/2020 Kwon ................ H01G 4/30
2021/0304969 A1\* 9/2021 Ishii ................. H01G 4/1227

\* cited by examiner

MULTILAYER CERAMIC CAPACITOR

CROSS-REFERENCE TO RELATED APPLICATION(S)

This application claims benefit of priority to Korean Patent Application No. 10-2020-0149551 filed on Nov. 10, 2020 in the Korean Intellectual Property Office, the disclosure of which is incorporated herein by reference in its entirety.

BACKGROUND

1. Field

The present disclosure relates to a multilayer ceramic capacitor.

2. Description of Related Art

In general, an electronic component using a ceramic material, such as a capacitor, an inductor, a piezoelectric element, a varistor, a thermistor, or the like, may include a ceramic body made of a ceramic material, an internal electrode formed in the ceramic body, and an external electrode installed on a surface of the ceramic body to be connected to the internal electrode.

Recently, as an electronic product has been miniaturized and multifunctionalized, a chip component has also been miniaturized and made highly functional. Accordingly, a multilayer ceramic capacitor is also required to be decreased in size and increased in capacity.

Conventionally, an area of a dielectric layer was formed to be larger than an area of an internal electrode, and a margin region was formed in a periphery portion of the internal electrode, except for a portion of the internal electrode connected to an external electrode. However, in this case, when tens to hundreds of dielectric layers are stacked, the dielectric layers may be stretched to fill step difference portions, and the internal electrode may be also bent. When the internal electrode was bent, there may be a problem in that a breakdown voltage (BDV) may decrease in a corresponding portion.

In order to solve this problem, a method of separately preparing and attaching a sheet-shaped margin portion has recently been used. However, when the margin portion was formed by attaching a separately manufactured sheet, there was a problem in that delamination may occur between the margin portion and the ceramic body.

SUMMARY

An aspect of the present disclosure is to provide a multilayer ceramic capacitor having improved moisture resistance reliability.

Another aspect of the present disclosure is to provide a multilayer ceramic capacitor having improved mechanical strength.

According to an aspect of the present disclosure, a multilayer ceramic capacitor includes a ceramic body including a dielectric layer, a first internal electrode and a second internal electrode, disposed to oppose each other with the dielectric layer interposed therebetween, and including a first surface and a second surface, opposing each other in a first direction, a third surface and a fourth surface, opposing each other in a second direction, and a fifth surface and a sixth surface, opposing each other in a third direction; a first external electrode disposed on the first surface of the ceramic body and connected to the first internal electrode, and a second external electrode disposed on the second surface of the ceramic body and connected to the second internal electrode. The ceramic body further includes a capacitance formation portion including the first internal electrode and the second internal electrode, stacked in the third direction with the dielectric layer interposed therebetween, to form capacitance; a first margin portion and a second margin portion disposed on both surfaces of the capacitance formation portion, respectively, in the second direction; and a first cover portion and a second cover portion, disposed on both surfaces of the capacitance formation portion, both surfaces of the first margin portion, and both surfaces of the second margin portion in the third direction, respectively. The first and second cover portions each include a first cover layer adjacent to an internal electrode, disposed on an outermost side among the first and second internal electrodes, and a second cover layer disposed on the first cover layer, and an interface at which the first cover layer and the second cover layer are in contact with each other.

According to another aspect of the present disclosure, a multilayer ceramic capacitor includes a ceramic body including a dielectric layer, a first internal electrode and a second internal electrode, disposed to oppose each other with the dielectric layer interposed therebetween; and a first external electrode and a second external electrode disposed on two surfaces of the ceramic body opposing in a first direction and connected to the first and second internal electrodes, respectively. The ceramic body further includes a capacitance formation portion including the first and second internal electrodes, stacked in a third direction with the dielectric layer interposed therebetween, to form capacitance; a first margin portion and a second margin portion disposed on both surfaces of the capacitance formation portion, respectively, in a second direction orthogonal to the first direction and to a third direction in which the first and second internal electrodes and the dielectric layer are stacked; and a first cover portion and a second cover portion, disposed on both surfaces of the capacitance formation portion, both surfaces of the first margin portion, and both surfaces of the second margin portion in the third direction, respectively. The first and second cover portions each comprise two or more cover layers, stacked in the third direction and having a discrete surface between adjacent layers of the two or more cover layers.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
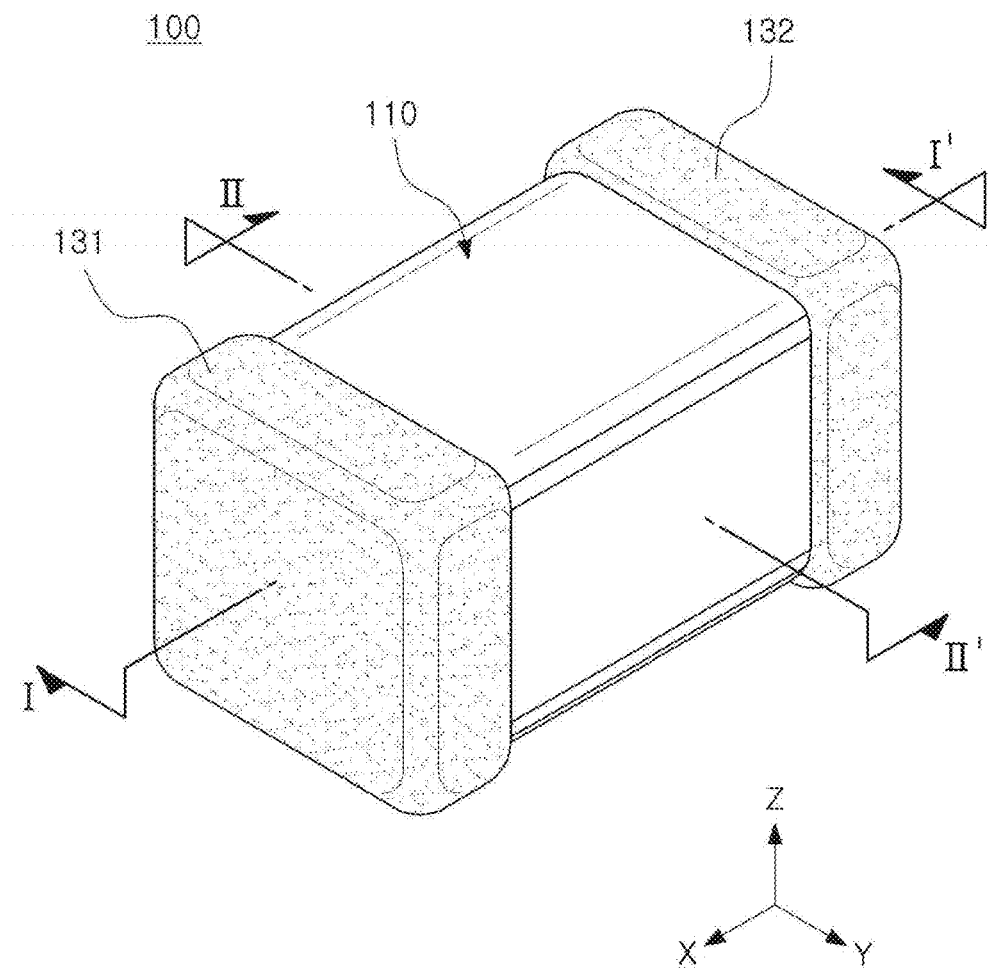
FIG. 1 is a perspective view schematically illustrating a multilayer ceramic capacitor according to an embodiment of the present disclosure.
Figure 2:
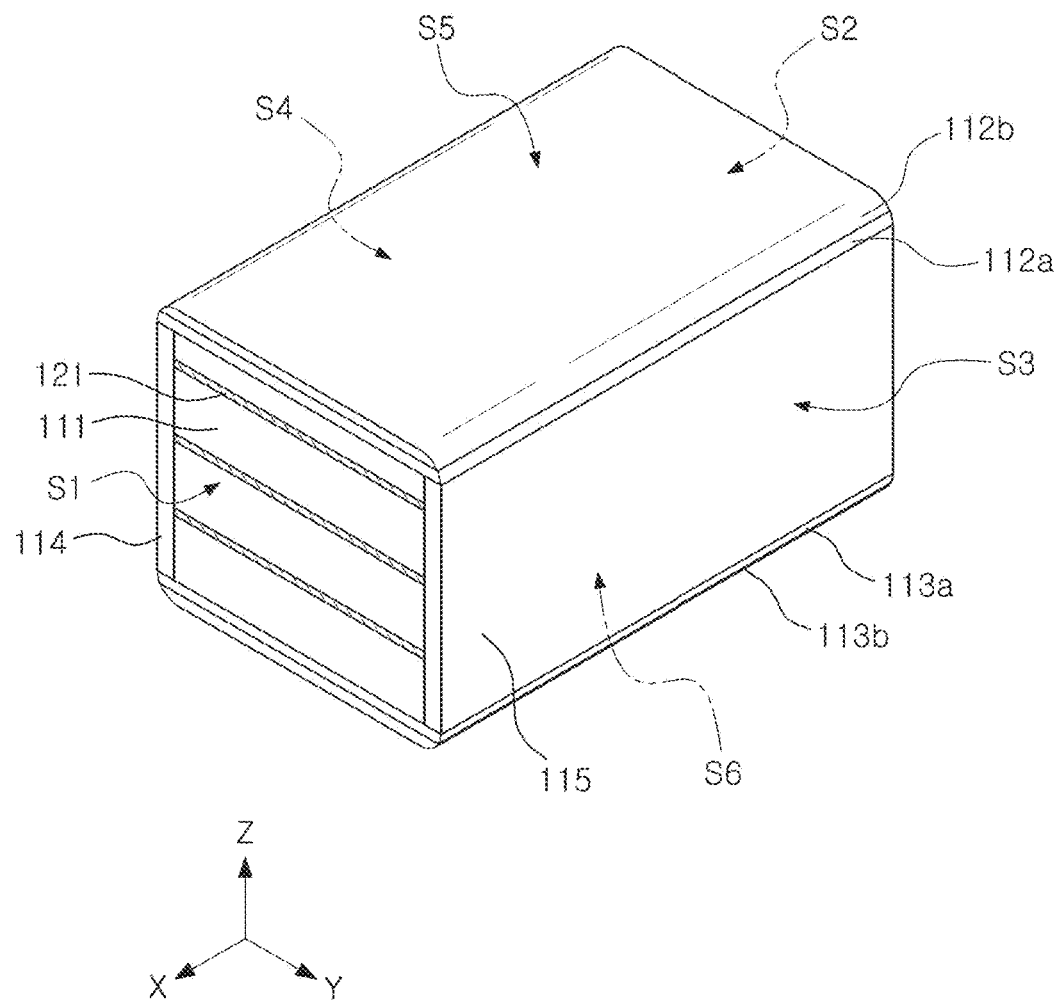
FIG. 2 is a perspective view schematically illustrating the ceramic body of FIG. 1.
Figure 3:
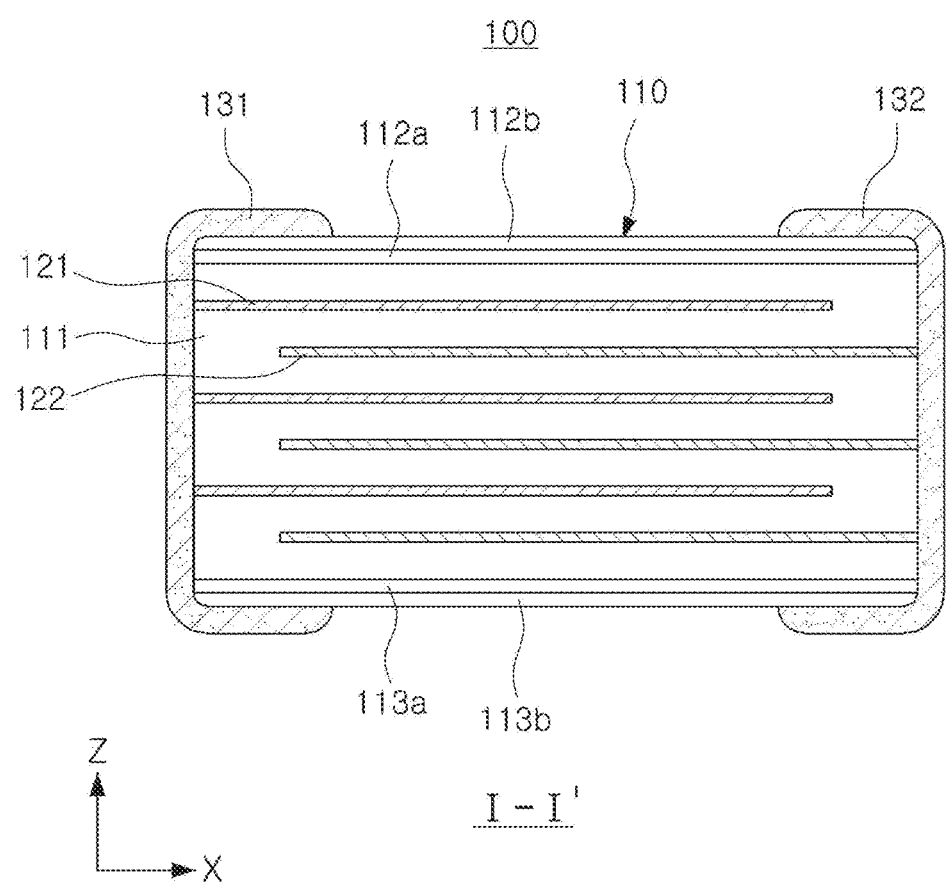
FIG. 3 is a cross-sectional view of FIG. 1, taken along line I-I'.
Figure 4:
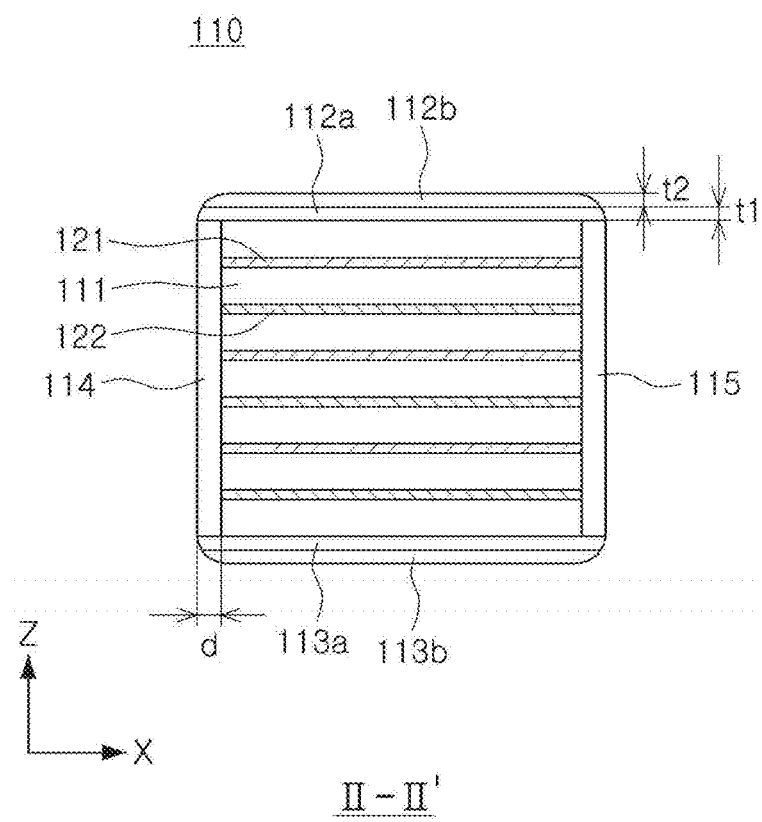
FIG. 4 is a cross-sectional view of FIG. 1, taken along line II-II'.
Figure 5:
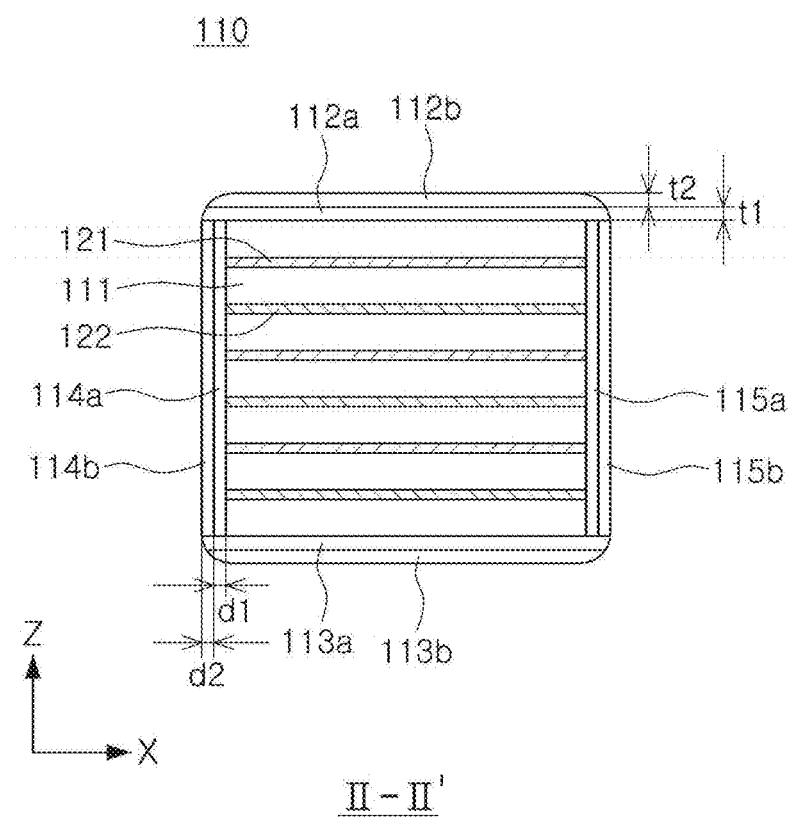
FIG. 5 is a cross-sectional view illustrating a modified embodiment of FIG. 4.
Figure 6:
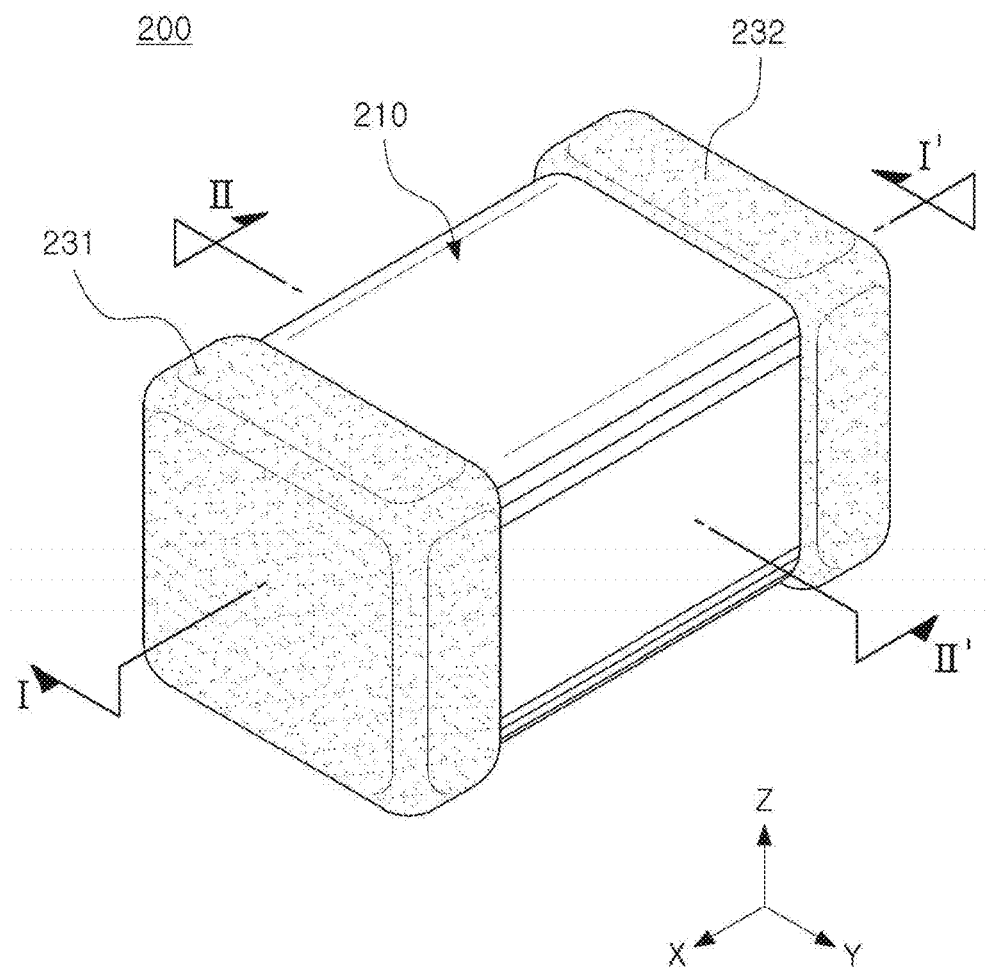
FIG. 6 is a perspective view schematically illustrating a multilayer ceramic capacitor according to another embodiment of the present disclosure.
Figure 7:
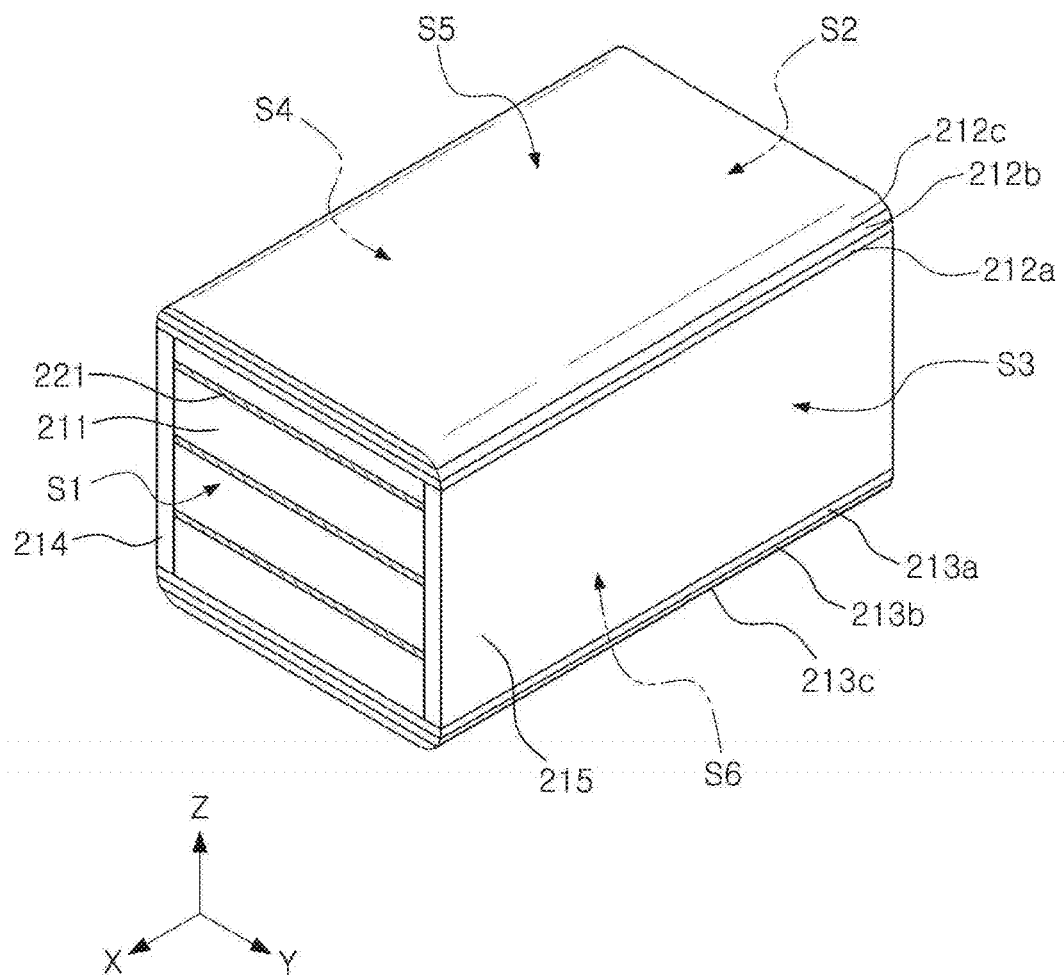
FIG. 7 is a perspective view schematically illustrating the ceramic body of FIG. 6.
Figure 8:
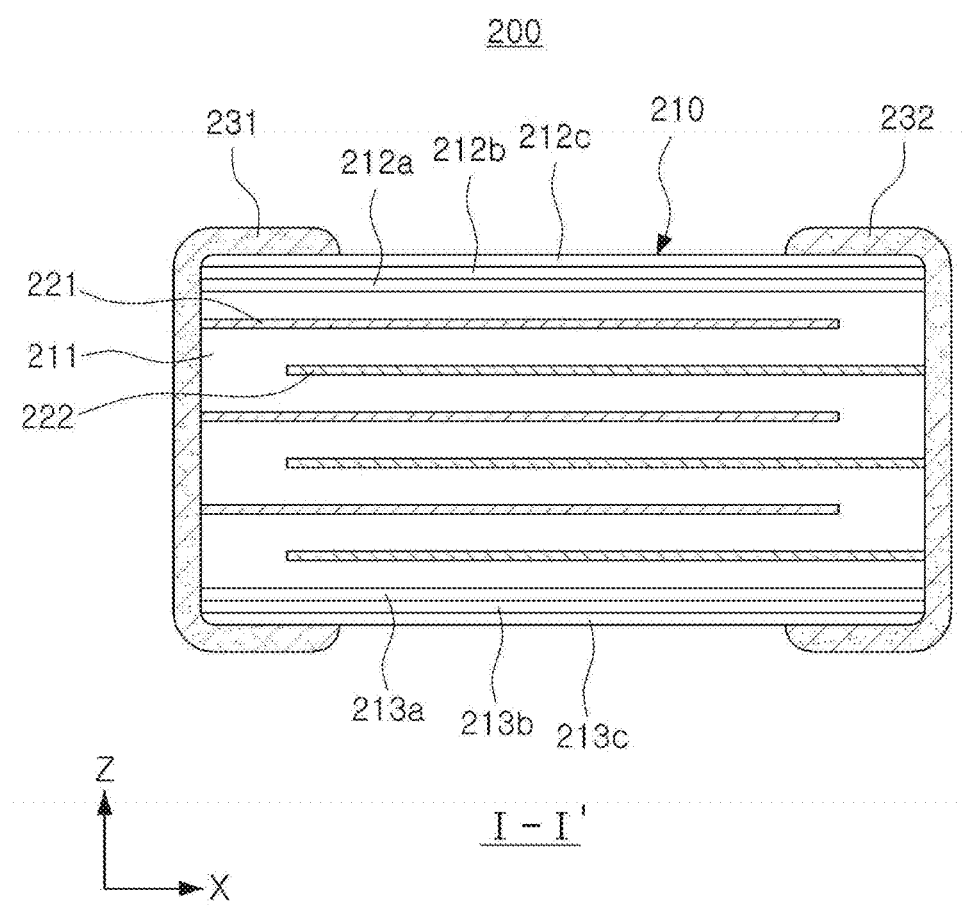
FIG. 8 is a cross-sectional view of FIG. 6, taken along line I-I'.
Figure 9:
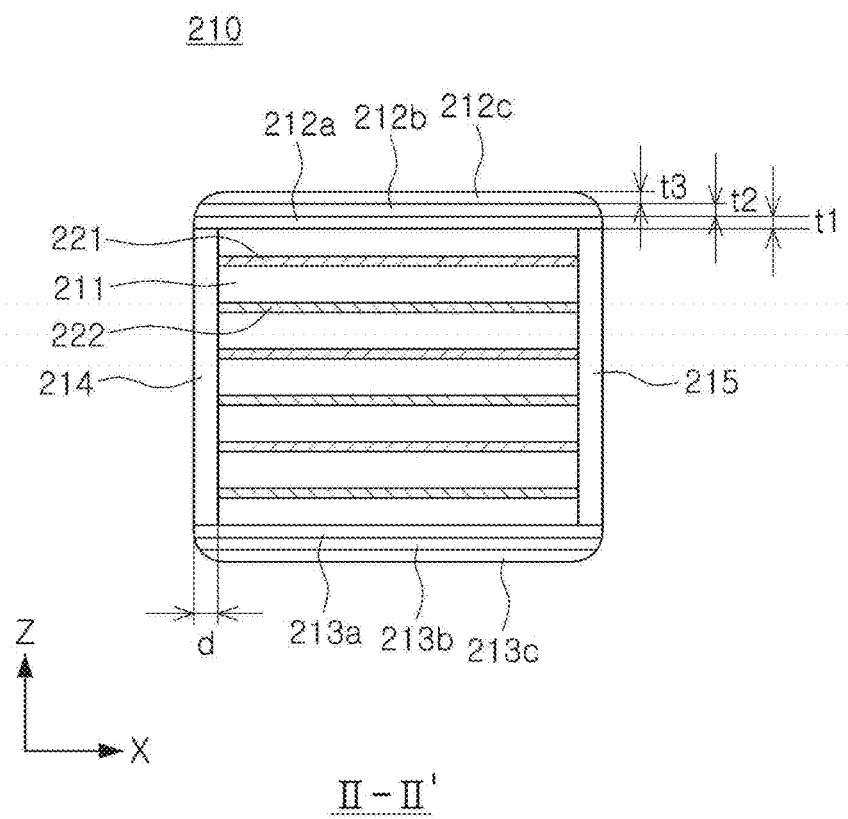
FIG. 9 is a cross-sectional view of FIG. 6, taken along line II-II'.
Figure 10:
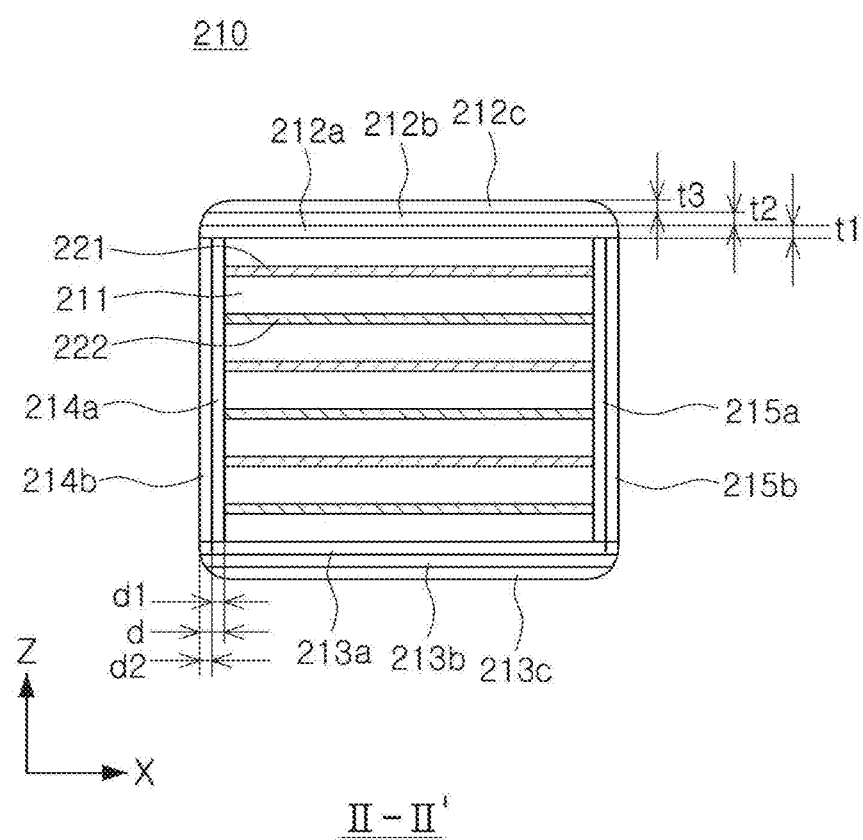
FIG. 10 is a cross-sectional view illustrating a modified embodiment of FIG. 9.

Hereinafter, embodiments of the present disclosure will be described in detail with reference to the accompanying drawings. The present disclosure may, however, be exemplified in many different forms and should not be construed as being limited to the specific embodiments set forth herein. Further, embodiments of the present disclosure may be provided for a more complete description of the present disclosure to those skilled in the art. Accordingly, the shapes and sizes of the elements in the drawings may be exaggerated for clarity of description, and the elements denoted by the same reference numerals in the drawings may be the same elements.

In order to clearly illustrate the present disclosure, portions not related to the description are omitted, and thicknesses are enlarged in order to clearly represent layers and regions, and similar portions having the same functions within the same scope are denoted by similar reference numerals throughout the specification.

In the present specification, expressions such as "have," "may have," "include," "comprise," "may include," or "may comprise" may refer to the presence of corresponding features (e.g., elements such as numbers, functions, actions, or components), and does not exclude the presence of additional features.

In the present specification, expressions such as "A and/or B," "at least one of A and B," or "one or more of A and B" may include all possible combinations of items listed together. For example, "A and/or B," "at least one of A and B," or "one or more of A and B" may refer to (1) including at least one A, (2) including at least one B, or (3) including all at least one A and at least one B.

In the drawings, an X-direction may be defined as a first direction, an L direction, or a length direction, a Y-direction may be defined as a second direction, a W direction, or a width direction, and a Z-direction may be defined as a third direction, a T direction, or a thickness direction.

The present disclosure relates to a multilayer ceramic capacitor. FIGS. 1 to 5 are views schematically illustrating a multilayer ceramic capacitor according to an embodiment of the present disclosure. Referring to FIGS. 1 to 5, a multilayer ceramic capacitor 100 according to an embodiment of the present disclosure may include a ceramic body 110 including a dielectric layer 111, and a first internal electrode 121 and a second internal electrode 122, disposed to oppose each other with the dielectric layer 111 interposed therebetween, and including a first surface S1 and a second surface S2, opposing each other in a first direction (an X-direction), a third surface S3 and a fourth surface S4, opposing each other in a second direction (a Y-direction), and a fifth surface S5 and a sixth surface S6, opposing each other in a third direction (a Z-direction); and a first external electrode 131 disposed on the first surface S1 of the ceramic body 110 and connected to the first internal electrode 121, and a second external electrode 132 disposed on the second surface S2 of the ceramic body 110 and connected to the second internal electrode 122.

In this case, the ceramic body 110 may further include a capacitance formation portion including the first internal electrode 121 and the second internal electrode 122, stacked in the third direction (the Z-direction), with the dielectric layer 111 interposed therebetween, to form capacitance, and a first margin portion 114 and a second margin portion 115, disposed on both surfaces of the capacitance formation portion in the second direction (the Y-direction); and a first cover portion 112 and a second cover portion 113, disposed on both surfaces of the capacitance formation portion, both surfaces of the first margin portion 114, and both surfaces of the second margin portion 115 in the third direction (the Z-direction), respectively, wherein the first and second cover portions 112 and 113 may include a first cover layer 112a or 113a adjacent to an internal electrode, among the first and second internal electrodes 121 and 122, disposed on an outermost side, and a second cover layer 112b or 113b disposed on the first cover layer 112a or 113a, and may include an interface with which the first cover layer 112a or 113a and the second cover layer 112b or 113b are in contact.

In the ceramic body 110 of the embodiment, the disposing the first cover portion 112 and the second cover portion 113 on the both surfaces of the capacitance formation portion, the both surfaces of the first margin portion 114, and the both surfaces of the second margin portion 115 in the third direction (the Z-direction) refers to a structure in which the first margin portion 114 and the second margin portion 115 are first attached to the both surfaces of the capacitance formation portion in the second direction (the Y-direction), and the capacitance formation portion, the first cover portion 112 and the second cover portion 113 are then attached thereto.

Figure 11:
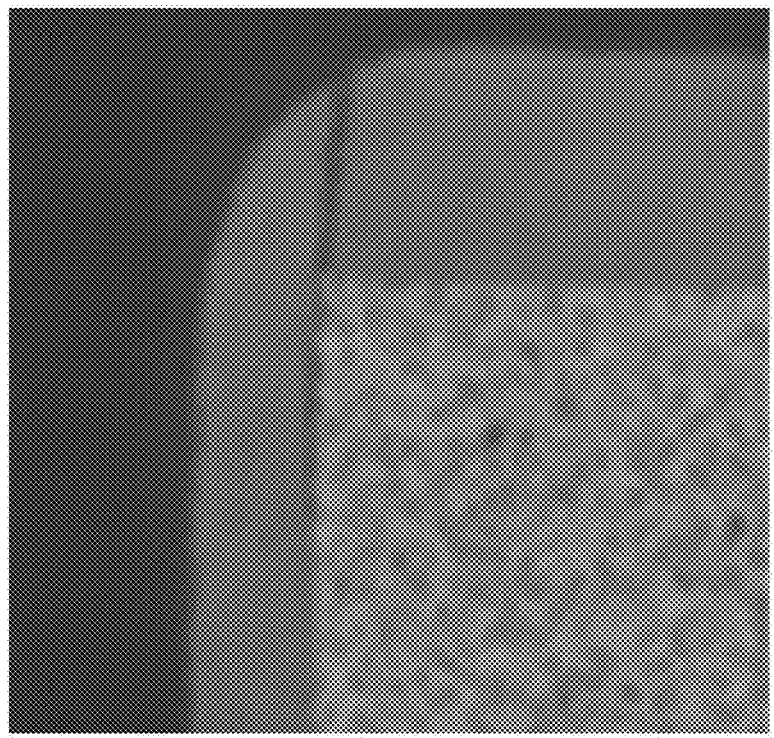
FIG. 11 is a photograph of a cover portion in which delamination occurs in a conventional structure.

FIG. 11 is a photograph of an X-Y plane of a conventional multilayer ceramic capacitor. The conventional multilayer ceramic capacitor may have a structure in which cover portions are attached above and below a capacitance formation portion, and then margin portions are attached to cover both side surfaces of the capacitance formation portion and both side surfaces of the cover portions. In this case, a problem in which the margin portions are widely expanded in a manufacturing process thereof may occur. FIG. 11 shows the multilayer ceramic capacitor in which the margin portion is widely expanded, as described above. Referring to the figure, when delamination occurs in the margin portion, an internal electrode may be directly exposed to external moisture or the like.

The present disclosure may have a structure in which a margin portion is first attached to a capacitance formation portion and a cover portion is then attached thereto. A structure in which the first and second cover portions 112 and 113 are attached to both surfaces of the capacitance formation portion to which the first margin portion 114 and the second margin portion 115 are first attached, in the third direction (the Z-direction), may refer to a structure in which the first cover portion 112 and the second cover portion 113 are arranged to cover both surfaces of the capacitance formation portion, both surfaces of the first margin portion 114, and both surfaces of the second margin portion 115 in the third direction (the Z-direction), respectively. In the structure to which the cover portion is attached later as described above, even when delamination occurs in the attachment portion, an internal electrode may not be immediately exposed externally, because the cover portion may first be separated. For example, the present embodiment may greatly improve moisture resistance reliability, compared to the conventional structure.

In the present embodiment, the first cover portion 112 and the second cover portion 113 of the ceramic body 110 may include an interface between the first cover layers 112a and 113a and the second cover layers 112b and 113b. In the present specification, the term "interface" may refer to a surface in which two layers contacting each other are provided to be distinguishable from each other. The term "distinguishable" may refer to a state in which properties of two layers are different from each other due to physical and/or chemical differences. For example, the first cover layers 112a and 113a and the second cover layers 112b and 113b may have different physical and/or chemical properties. A multilayer ceramic capacitor according to the present disclosure may include the first cover layers 112a and 113a and the second cover layers 112b and 113b having different properties, to prevent occurrence of delamination and improve mechanical reliability of a product. The first interface may be visually confirmed through a scanning electron microscope (SEM), etc., but is not limited thereto. When it is difficult to visually confirm an interface, it may be verified by analyzing physical properties of the first cover layers and the second cover layers.

In an embodiment of the present disclosure, a ceramic body 110 may include a capacitance formation portion, a first cover portion 112, a second cover portion 113, a first margin portion 114, and a second margin portion 115.

Although a specific shape of the ceramic body 100 is not particularly limited, as illustrated, the ceramic body 110 may have a hexahedral shape or a shape similar thereto. Due to shrinkage of ceramic powder particles included in the ceramic body 110 during a sintering process, the ceramic body 110 may not have a perfectly straight hexahedral shape, but may have a substantially hexahedral shape. The ceramic body 110 may be round treated such that corners are not angled, as necessary. The round treatment may be performed, for example, by barrel grinding or the like, but may not be limited thereto.

In the capacitance formation portion of the multilayer ceramic capacitor according to the present disclosure, a dielectric layer 111, a first internal electrode 121, and a second internal electrode 122 may be alternately stacked. The dielectric layer 111, the first internal electrode 121, and the second internal electrode 122 may be stacked in the third direction (the Z-direction). A plurality of dielectric layers 111 forming the capacitance formation portion may be in a sintered state, and boundaries between adjacent dielectric layers 111 may be integrated with each other such that boundaries therebetween are not readily apparent without using a scanning electron microscope (SEM).

According to an embodiment of the present disclosure, a raw material for forming the dielectric layer 111 is not limited as long as a sufficient capacitance can be obtained therewith. For example, a barium titanate-based material, a lead composite perovskite-based material, a strontium titanate-based material, or the like may be used.

In addition, various ceramic additives, organic solvents, plasticizers, binders, dispersants, or the like may be added to powder particles such as barium titanate ($BaTiO_3$) or the like, according to the object of the present disclosure.

The dielectric layer 111 may be formed by adding an additive as necessary to slurry including the above-described main component and subcomponent, coating and drying the same on a carrier film to prepare a plurality of ceramic sheets. The ceramic sheets may be formed by manufacturing the slurry in a sheet shape having a thickness of several micrometers by a doctor blade method, but is not limited thereto.

The first and second internal electrodes 121 and 122 may be stacked such that cross-sections thereof are respectively exposed from opposite end portions of the ceramic body 110. Specifically, the first and second internal electrodes 121 and 122 may be exposed from both surfaces of the ceramic body 110 in the first direction (the X-direction), respectively, and the first internal electrode 121 may be exposed from the first surface S1 of the ceramic body 110, and the second internal electrode 122 may be exposed from the second surface S2 of the ceramic body 110.

A material for forming the first and second internal electrodes 121 and 122 may not be particularly limited, and, for example, may be formed using a conductive paste including at least one material among silver (Ag), palladium (Pd), gold (Au), platinum (Pt), nickel (Ni), copper (Cu), tin (Sn), tungsten (W), titanium (Ti), and alloys thereof.

The ceramic body 110 may be formed by alternately stacking a ceramic green sheet on which the first internal electrode 121 is printed on the dielectric layer 111 and a ceramic green sheet on which the second internal electrode 122 is printed on the dielectric layer 111, in the third direction (the Z-direction). As the printing method of the first and second internal electrodes, a screen-printing method, a gravure printing method, or the like may be used, but are not limited thereto.

In a multilayer ceramic capacitor 100 according to an embodiment of the present disclosure, a first external electrode 131 and a second external electrode 132 may be disposed on an outer surface of a ceramic body 110. The first external electrode 131 may be connected to a first internal electrode 121, and the second external electrode 132 may be connected to a second internal electrode 122.

The first external electrode 131 and the second external electrode 132 may include a conductive metal. The conductive metal may be at least one conductive metal among copper (Cu), nickel (Ni), tin (Sn), palladium (Pd), platinum (Pt), gold (Au), silver (Ag), tungsten (W), titanium (Ti), lead (Pb), and alloys thereof, but is not limited thereto.

A multilayer ceramic capacitor 100 according to an embodiment of the present disclosure may include a first cover portion 112 and a second cover portion 113, disposed on both surfaces of a capacitance formation portion, both surfaces of a first margin portion 114, and both surfaces of a second margin portion 115 in the third direction (the Z-direction), respectively, wherein the first and second cover portions 112 and 113 may include a first cover layer 112a or 113a adjacent to an internal electrode, disposed on an outermost side among first and second internal electrodes 121 and 122, and a second cover layer 112b or 113b disposed on the first cover layer 112a or 113a. The both surfaces of the capacitance formation portion in the third direction may disposed on substantially the same plane as the both surfaces of the first margin portion and the both surfaces of the second margin portion in the third direction, respectively. One or ordinary skill in the art would understand that the expression "substantially the same" refers to being the same (lying on the same plane) by allowing process errors, positional deviations, and/or measurement errors that may occur in a manufacturing process.

According to an embodiment of the present disclosure, a maximum value of a width of the first cover portion 112 or a width of the second cover portion 113 in the second direction (the Y-direction) may be substantially equal to a maximum value of a width of the ceramic body 110 in the second direction. One or ordinary skill in the art would understand that the expression "substantially equal" refers to being the same by allowing process errors, positional deviations, and/or measurement errors that may occur in a manufacturing process.

The first cover layers 112a and 113a and the second cover layers 112b and 113b may include a ceramic material, for example, a barium titanate ($BaTiO_3$)-based ceramic material.

The first cover layers 112a and 113a and the second cover layers 112b and 113b may be formed by stacking a single dielectric layer or two or more dielectric layers in a vertical direction, respectively, and may basically play a role in preventing damage to the internal electrodes caused by physical or chemical stress.

According to an embodiment of the present disclosure, an average density of the second cover layers 112b and 113b included in the multilayer ceramic capacitor of the present disclosure may be higher than an average density of the first cover layers 112a and 113a. In the present specification, "average density" may refer to an average of densities of samples taken from five (5) different places, and, for example, may be a value measured using a Density Meter Excellence D6 manufactured by METTLER TOLEDO, or the like. The multilayer ceramic capacitor 100 according to the present disclosure may use a material having an average density of the second cover layers 112b and 113b, higher than an average density of the first cover layers 112a and 113a, to prevent occurrence of cracks or the like by sintering mismatch that may occur during the sintering process, to improve reliability. In addition, an average density of the second cover layers 112b and 113b may be controlled to be higher than an average density of the first cover layers 112a and 113a to have higher strength of a portion of a dielectric layer exposed externally, to improve moisture resistance reliability.

In one example, a thickness of an element may mean a dimension of the element in a direction perpendicular to a planar surface of the element. The thickness of the element may be any one of an average thickness, a maximum thickness, a minimum thickness, or a thickness of the element measured in a predetermined region, unless contradictory to another definition explicitly described. In one example, the thickness of the element may be determined by defining a predetermined number (e.g., 5) of points to the left and the predetermined number (e.g., 5) of points to the right from a reference center point of the element at equal intervals (or non-equal intervals, alternatively), measuring a thickness of each of the points at equal intervals (or non-equal intervals, alternatively), and obtaining an average value therefrom. Alternatively, the thickness may be the maximum thickness or the minimum thickness of the multiple measurements. Alternatively, the thickness may be a thickness of the reference center point in the measured region. In one example, an optical microscope or a scanning electron microscope (SEM) may be used in the measurement, although the present disclosure is not limited thereto. Other measurement methods and/or tools appreciated by one of ordinary skill in the art, even if not described in the present disclosure, may also be used.

In an embodiment of the present disclosure, a maximum thickness of a second cover layer 112b or 113b included in a first or second cover portion 112 or 113 of the present disclosure may be 20% to 70% of a maximum thickness of the first or second cover portion 112 or 113. The maximum thickness of the second cover layer 112b or 113b may be 70% or less, 65% or less, 60% or less, 55% or less, or 50% or less of the maximum thickness of the first or second cover portion 112 or 113. Since the second cover layers 112b and 113b have a higher density than the first cover layers 112a and 113a, sufficient moisture resistance reliability may be secured using a thickness within the above range. When the maximum thickness of the second cover layer 112b or 113b is too thin, it may be difficult to secure desired moisture resistance reliability, and when the maximum thickness of the second cover layer 112b or 113b is too thick, it may be difficult to correct a mismatch in a sintering process.

According to an embodiment of the present disclosure, an average particle diameter of dielectric grains included in a second cover layer 112b or 113b may be greater than an average particle diameter of dielectric grains included in a first cover layer 112a or 113a. In the present specification, the "average particle diameter" of the dielectric grains may refer to an average value of lengths, in the X-axis direction, obtained by photographing random five (5) places of an XZ plane of a multilayer ceramic capacitor using a scanning electron microscope (SEM, JSM-7400F of Jeol), and calculating then the obtained image using an image analysis program (Image Pro Plus ver 4.5 of Mediacybernetics).

During a sintering process, since growth and densification of grains may occur at the same time in a dielectric, as the densification of grains increases, growth of the grains may also increase, resulting in an increase in grain size. When the densification of grains decreases, growth of the grains may be also inhibited to decrease sizes of the grains. Therefore, it is characterized in that the average particle diameter of the dielectric grains included in the second cover layer 112b or 113b having a relatively high dielectric density may be larger than the average particle diameter of the dielectric grains included in the first cover layer 112a or 113a. For this reason, effects of improving a mismatch in sintering and moisture resistance reliability may be acquired.

In an embodiment of the present disclosure, first cover layers 112a and 113a and second cover layers 112b and 113b of a multilayer ceramic capacitor 100 according to the present disclosure may include a ceramic component having a similar composition to a dielectric layer 111 of a capacitance formation portion, as a main component. In the present specification, the "main component" may mean a component occupying a relatively large proportion by weight, compared to other components, and may mean a component that may be 50% by weight or more, based on a weight of an entire composition or an entire dielectric layer. In addition, "subcomponent" may mean a component occupying a relatively small proportion by weight, compared to other components, and may mean a component that may be less than 50% by weight, based on a weight of the entire composition or the entire dielectric layer.

The main component may be a component represented by $(Ba_{1-x}Ca_x)(Ti_{1-y}(Zr, Sn, Hf)_y)O_3$ (where, $0 \leq x \leq 1$, $0 \leq y \leq 0.5$). The main component may be, for example, a compound in which Ca, Zr, Sn and/or Hf are partially dissolved in $BaTiO_3$. In the formula, x is 0 or more and 1 or less, and y is 0 or more and 0.5 or less, but are not limited thereto. For example, when x is 0 and y is 0 in the formula, the main component may be $BaTiO_3$.

In an example, first and second cover portions 112 and 113 of a multilayer ceramic capacitor 100 according to the present disclosure may include one or more selected from the group consisting of sodium (Na), lithium (Li), and boron (B), as a subcomponent. In this case, in the first and second cover portions 112 and 113, an amount of Na, Li and/or B included in a second cover layer 112b or 113b may be larger than an amount of Na, Li and/or B included in a first cover layer 112a or 113a. The first and second cover portions 112 and 113 may be adjusted such that an amount of Na, Li and/or B included in the second cover layer 112b or 113b is larger than an amount of Na, Li and/or B included in the first cover layer 112a or 113a, to increase densification of the second cover layers 112b and 113b of the first and second cover portions 112 and 113, to improve moisture resistance.

In another embodiment of the present disclosure, first and second cover portions 112 and 113 of a multilayer ceramic capacitor 100 according to the present disclosure may include magnesium (Mg) as a subcomponent. In this case, an amount of magnesium (Mg) included in a first cover layer 112a or 113a of the first and second cover portions 112 and 113 may be larger than an amount of magnesium (Mg) included in a second cover layer 112b or 113b. The first and second cover portions 112 and 113 may be adjusted such that an amount of magnesium (Mg) included in the first cover layer 112a or 113a is larger than an amount of magnesium (Mg) included in the second cover layer 112b or 113b, to increase densification of the second cover layers 112b and 113b of the first and second cover portions 112 and 113, compared to the first cover layers 112a and 113a, to improve moisture resistance.

According to a modified embodiment of the present disclosure, a first margin portion 114 and a second margin portion 115 included in a multilayer ceramic capacitor 100 of the present disclosure may include a first margin layer 114a or 115a adjacent to first or second internal electrode 121 or 122 and a second margin layer 114b or 115b disposed on the first margin layer 114a or 115a, respectively, and may include an interface with which the first margin layer 114a or 115a and the second margin layer 114b or 115b are in contact.

According to an embodiment of the present disclosure, an average density of a second margin layer 114b or 115b included in a multilayer ceramic capacitor 100 of the present disclosure may be higher than an average density of a first margin layer 114a or 115a included therein.

In an embodiment of the present disclosure, a thickness of a second margin layer 114b or 115b included in first and second margin portions 114 and 115 of the present disclosure may be 20% to 70% of a maximum thickness of the first and second margin portions 114 and 115.

According to an embodiment of the present disclosure, an average particle diameter of dielectric grains included in a second margin layer 114b or 115b may be greater than an average particle diameter of dielectric grains included in a first margin layer 114a or 115a. Descriptions of the interface, the average density, the thickness, the average particle diameter, the main component, the subcomponent, and the like of the first margin layers 114a and 115a and the second margin layers 114b and 115b are identical to those of the first cover layers 112a and 113a and the second cover layers 112b and 113b, and will be thus omitted.

In another embodiment of the present disclosure, a multilayer ceramic capacitor 200 according to the present disclosure may further include third cover layers 212c and 213c respectively disposed on second cover layers 212b and 213b. FIGS. 6 to 10 are views schematically illustrating a multilayer ceramic capacitor according to the present embodiment. Referring to FIGS. 6 to 10, a multilayer ceramic capacitor 200 according to the present embodiment may include a ceramic body 210 including a dielectric layer 211, and a first internal electrode 221 and a second internal electrode 222, disposed to oppose each other with the dielectric layer 211 interposed therebetween, and including a first surface S1 and a second surface S2, opposing each other in the first direction (the X-direction), a third surface S3 and a fourth surface S4, opposing each other in the second direction (the Y-direction), and a fifth surface S5 and a sixth surface S6, opposing each other in the third direction (the Z-direction); and a first external electrode 231 disposed on the first surface S1 of the ceramic body 210 and connected to the first internal electrode 221, and a second external electrode 232 disposed on the second surface S2 of the ceramic body 210 and connected to the second internal electrode 222.

In addition, the ceramic body 210 may further include a capacitance formation portion including the first internal electrode 221 and the second internal electrode 222, stacked in the third direction (the Z-direction), with the dielectric layer 211 interposed therebetween, to form capacitance, and a first margin portion 214 and a second margin portion 215, disposed on both surfaces of the capacitance formation portion in the second direction (the Y-direction); and a first cover portion 212 and a second cover portion 213, disposed on both surfaces of the capacitance formation portion, both surfaces of the first margin portion 214, and both surfaces of the second margin portion 215 in the third direction (the Z-direction), respectively. The first and second cover portions 212 and 213 may include a first cover layer 212a or 213a adjacent to an internal electrode, disposed on an outermost side among the first and second internal electrodes 221 and 222, a second cover layer 212b or 213b disposed on the first cover layer 212a or 213a, and a third cover layer 212c or 213c disposed on the first cover layer 212b or 213b, and may include an interface with which the first cover layer 212a or 213a and the second cover layer 212b or 213b are in contact, and an interface with which the second cover layer 212b or 213b and the third cover layer 212c or 213c are in contact.

According to an embodiment of the present disclosure, among a first cover layer 212a or 213a, a second cover layer 212b or 213b, and a third cover layer 212c or 213c, included in a multilayer ceramic capacitor 200 of the present disclosure, the third cover layer 212c or 213c may have the highest average density. For example, an average density of the third cover layer 212c or 213c may be higher than an average density of the second cover layer 212b or 213b. The average density of the third cover layer 212c or 213c may be adjusted by amounts of the above-described subcomponents or the like, and amounts of the subcomponents of the third cover layer 212c or 213c may be relatively determined, depending on an order of magnitudes of average densities.

In an embodiment of the present disclosure, a maximum thickness of the third cover layer 212c or 213c included in the first and second cover portions 212 and 213 of the present disclosure may be 20% to 70% of a maximum thickness of the first or second cover portion 112 or 113. The maximum thickness of the third cover layer 212c or 213c may be 70% or less, 65% or less, 60% or less, 55% or less, or 50% or less of the maximum thickness of the first or second cover portion 112 or 113.

According to an embodiment of the present disclosure, among a first cover layer 212a or 213a, a second cover layer 212b or 213b, and a third cover layer 212c or 213c, included in a multilayer ceramic capacitor 200 of the present disclosure, an average particle diameter of dielectric grains included in the third cover layer 212c or 213c may be the largest. For example, an average particle diameter of dielectric grains included in the third cover layer 212c or 213c may be larger than an average particle diameter of dielectric grains included in the second cover layer 212b or 213b.

Descriptions of the interface, the average density, the thickness, the average particle diameter, the main component, and the subcomponent of the third cover layer 212c or 213c are identical to those described above, and will be thus omitted.

According to another embodiment of the present disclosure, an average density of second cover layers 112b and 113b included in a multilayer ceramic capacitor 100 of the present disclosure may be lower than an average density of first cover layers 112a and 113a. The multilayer ceramic capacitor 100 according to the present disclosure may use a material having an average density of the second cover layers 112b and 113b, lower than an average density of the first cover layers 112a and 113a, to prevent occurrence of cracks or the like by sintering mismatch that may occur during the sintering process, to improve reliability. In addition, an average density of the second cover layers 112b and 113b may be controlled to be lower than an average density of the first cover layers 112a and 113a to have higher strength of a portion of a dielectric layer disposed internally, to improve mechanical strength of the multilayer ceramic capacitor 100.

In an embodiment of the present disclosure, a maximum thickness of a second cover layer 112b or 113b included in a first or second cover portion 112 or 113 of the present disclosure may be 20% to 70% of a maximum thickness of the first or second cover portion 112 or 113. The maximum thickness of the second cover layer 112b or 113b may be 70% or less, 65% or less, 60% or less, 55% or less, or 50% or less of the maximum thickness of the first or second cover portion 112 or 113. The second cover layers 112b and 113b have a lower density than the first cover layers 112a and 113a. Therefore, when the second cover layers 112b and 113b have a thickness within the above range, even when external force or the like is applied, the second cover layers 112b and 113b may function to absorb such external force.

According to an embodiment of the present disclosure, an average particle diameter of dielectric grains included in a second cover layer 112b or 113b may be less than an average particle diameter of dielectric grains included in a first cover layer 112a or 113a.

In an example, first and second cover portions 112 and 113 of a multilayer ceramic capacitor 100 according to the present disclosure may include one or more selected from the group consisting of sodium (Na), lithium (Li), and boron (B), as a subcomponent. In this case, in the first and second cover portions 112 and 113, an amount of Na, Li and/or B included in a second cover layer 112b or 113b may be smaller than an amount of Na, Li and/or B included in a first cover layer 112a or 113a. The first and second cover portions 112 and 113 may be adjusted such that an amount of Na, Li and/or B included in the second cover layer 112b or 113b is smaller than an amount of Na, Li and/or B included in the first cover layer 112a or 113a, to increase densification of the first cover layers 112a and 113a of the first and second cover portions 112 and 113, to improve mechanical strength.

In another example of the present disclosure, first and second cover portions 112 and 113 of a multilayer ceramic capacitor 100 according to the present disclosure may include magnesium (Mg) as a subcomponent. In this case, an amount of magnesium (Mg) included in a first cover layer 112a or 113a of the first and second cover portions 112 and 113 may be smaller than an amount of magnesium (Mg) included in a second cover layer 112b or 113b. The first and second cover portions 112 and 113 may be adjusted such that an amount of magnesium (Mg) included in the first cover layer 112a or 113a is smaller than an amount of magnesium (Mg) included in the second cover layer 112b or 113b, to increase densification of the first cover layers 112a and 113a of the first and second cover portions 112 and 113, compared to the second cover layers 112b and 113b, to improve mechanical strength.

According to a modified embodiment of the present disclosure, a first margin portion 114 and a second margin portion 115 included in a multilayer ceramic capacitor 100 of the present disclosure may include a first margin layer 114a or 115a adjacent to first or second internal electrode 121 or 122 and a second margin layer 114b or 115b disposed on the first margin layer 114a or 115a, respectively, and may include an interface with which the first margin layer 114a or 115a and the second margin layer 114b or 115b are in contact.

According to an embodiment of the present disclosure, an average density of a second margin layer 114b or 115b included in a multilayer ceramic capacitor 100 of the present disclosure may be lower than an average density of a first margin layer 114a or 115a included therein.

In an embodiment of the present disclosure, a thickness of a second margin layer 114b or 115b included in first and second margin portions 114 and 115 of the present disclosure may be 20% to 70% of a maximum thickness of the first and second margin portions 114 and 115.

According to an embodiment of the present disclosure, an average particle diameter of dielectric grains included in a second margin layer 114b or 115b may be less than an average particle diameter of dielectric grains included in a first margin layer 114a or 115a. Descriptions of the interface, the average density, the thickness, the average particle diameter, the main component, the subcomponent, and the like of the first margin layers 114a and 115a and the second margin layers 114b and 115b are identical to those of the first cover layers 112a and 113a and the second cover layers 112b and 113b, and will be thus omitted.

In another embodiment of the present disclosure, a multilayer ceramic capacitor 200 according to the present disclosure may further include third cover layers 212c and 213c respectively disposed on second cover layers 212b and 213b. FIGS. 6 to 10 are views schematically illustrating a multilayer ceramic capacitor according to the present embodiment. Referring to FIGS. 6 to 10, a multilayer ceramic capacitor 200 according to the present embodiment may include a ceramic body 210 including a dielectric layer 211, and a first internal electrode 221 and a second internal electrode 222, disposed to oppose each other with the dielectric layer 211 interposed therebetween, and including a first surface S1 and a second surface S2, opposing each other in the first direction (the X-direction), a third surface S3 and a fourth surface S4, opposing each other in the second direction (the Y-direction), and a fifth surface S5 and a sixth surface S6, opposing each other in the third direction (the Z-direction); and a first external electrode 231 disposed on the first surface S1 of the ceramic body 210 and connected to the first internal electrode 221, and a second external electrode 232 disposed on the second surface S2 of the ceramic body 210 and connected to the second internal electrode 222.

In addition, the ceramic body 210 may further include a capacitance formation portion including the first internal electrode 221 and the second internal electrode 222, stacked in the third direction (the Z-direction), with the dielectric layer 211 interposed therebetween, to form capacitance, and a first margin portion 214 and a second margin portion 215, disposed on both surfaces of the capacitance formation portion in the second direction (the Y-direction); and a first cover portion 212 and a second cover portion 213, disposed on both surfaces of the capacitance formation portion, both surfaces of the first margin portion 214, and both surfaces of the second margin portion 215 in the third direction (the Z-direction), respectively, wherein the first and second cover portions 212 and 213 may include a first cover layer 212a or 213a adjacent to an internal electrode, among the first and second internal electrodes 221 and 222, disposed on an outermost side, a second cover layer 212b or 213b disposed on the first cover layer 212a or 213a, and a third cover layer 212c or 213c disposed on the first cover layer 212b or 213b, and may include an interface with which the first cover layer 212a or 213a and the second cover layer 212b or 213b are in contact, and an interface with which the second cover layer 212b or 213b and the third cover layer 212c or 213c are in contact.

According to an embodiment of the present disclosure, among a first cover layer 212a or 213a, a second cover layer 212b or 213b, and a third cover layer 212c or 213c, included in a multilayer ceramic capacitor 200 of the present disclosure, the third cover layer 212c or 213c may have the lowest average density. For example, an average density of the third cover layer 212c or 213c may be lower than an average density of the second cover layer 212b or 213b. The average density of the third cover layer 212c or 213c may be adjusted by amounts of the above-described subcomponents or the like, and amounts of the subcomponents of the third cover layer 212c or 213c may be relatively determined, depending on an order of magnitudes of average densities.

In an embodiment of the present disclosure, a maximum thickness of the third cover layer 212c or 213c included in the first and second cover portions 212 and 213 of the present disclosure may be 20% to 70% of a maximum thickness of the first or second cover portion 112 or 113. The maximum thickness of the third cover layer 212c or 213c may be 70% or less, 65% or less, 60% or less, 55% or less, or 50% or less of the maximum thickness of the first or second cover portion 112 or 113.

According to an embodiment of the present disclosure, among a first cover layer 212a or 213a, a second cover layer 212b or 213b, and a third cover layer 212c or 213c, included in a multilayer ceramic capacitor 200 of the present disclosure, an average particle diameter of dielectric grains included in the third cover layer 212c or 213c may be the smallest. For example, an average particle diameter of dielectric grains included in the third cover layer 212c or 213c may be smaller than an average particle diameter of dielectric grains included in the second cover layer 212b or 213b. Descriptions of the interface, the average density, the thickness, the average particle diameter, the main component, and the subcomponent of the third cover layer 212c or 213c are identical to those described above, and will be thus omitted.

According to a modified embodiment of the present disclosure, a first margin portion 114 and a second margin portion 115 included in a multilayer ceramic capacitor 100 of the present disclosure may include a first margin layer 114a or 115a adjacent to first or second internal electrode 121 or 122 and a second margin layer 114b or 115b disposed on the first margin layer 114a or 115a, respectively, and may include an interface with which the first margin layer 114a or 115a and the second margin layer 114b or 115b are in contact.

According to an embodiment of the present disclosure, an average density of a second margin layer 114b or 115b included in a multilayer ceramic capacitor 100 of the present disclosure may be lower than an average density of a first margin layer 114a or 115a included therein.

In an embodiment of the present disclosure, a thickness of a second margin layer 114b or 115b included in first and second margin portions 114 and 115 of the present disclosure may be 20% to 70% of a maximum thickness of the first and second margin portions 114 and 115.

According to an embodiment of the present disclosure, an average particle diameter of dielectric grains included in a second margin layer 114b or 115b may be less than an average particle diameter of dielectric grains included in a first margin layer 114a or 115a. Descriptions of the interface, the average density, the thickness, the average particle diameter, the main component, the subcomponent, and the like of the first margin layers 114a and 115a and the second margin layers 114b and 115b are identical to those of the first cover layers 112a and 113a and the second cover layers 112b and 113b, and will be thus omitted.

One of several effects of the present disclosure is to improve moisture resistance reliability of a multilayer ceramic capacitor.

One of several effects of the present disclosure is to improve mechanical strength of a multilayer ceramic capacitor.

However, various advantages and effects of the present disclosure are not limited to the above, and will be more easily understood in the process of describing specific embodiments of the present disclosure.

While example embodiments have been illustrated and described above, it will be apparent to those skilled in the art that modifications and variations could be made without departing from the scope of the present disclosure as defined by the appended claims.

What is claimed is:

1. A multilayer ceramic capacitor comprising:
a ceramic body including a dielectric layer, and a first internal electrode and a second internal electrode, disposed to oppose each other with the dielectric layer interposed therebetween, and including a first surface and a second surface, opposing each other in a first direction, a third surface and a fourth surface, opposing each other in a second direction, and a fifth surface and a sixth surface, opposing each other in a third direction; and
a first external electrode disposed on the first surface of the ceramic body and connected to the first internal electrode, and a second external electrode disposed on the second surface of the ceramic body and connected to the second internal electrode,
wherein the ceramic body further comprises:
a capacitance formation portion including the first internal electrode and the second internal electrode, stacked in the third direction with the dielectric layer interposed therebetween, to form capacitance;
a first margin portion and a second margin portion disposed on both surfaces of the capacitance formation portion, respectively, in the second direction; and
a first cover portion and a second cover portion, disposed on both surfaces of the capacitance formation portion, both surfaces of the first margin portion, and both surfaces of the second margin portion in the third direction, respectively,
wherein the first and second cover portions each comprise a first cover layer adjacent to an internal electrode, disposed on an outermost side among the first and second internal electrodes, and immediately adjacent to the capacitance formation portion, and a second cover layer disposed on the first cover layer, and an interface at which the first cover layer and the second cover layer are in contact with each other, and wherein an average density of the second cover layer is higher than an average density of the first cover layer.

2. The multilayer ceramic capacitor of claim 1, wherein the first cover portion and the second cover portion are disposed to cover the both surfaces of the capacitance formation portion, the both surfaces of the first margin portion, and the both surfaces of the second margin portion in the third direction, respectively.

3. The multilayer ceramic capacitor of claim 1, wherein the both surfaces of the capacitance formation portion in the third direction are disposed on substantially the same plane as the both surfaces of the first margin portion and the both surfaces of the second margin portion in the third direction, respectively.

4. The multilayer ceramic capacitor of claim 1, wherein a maximum value of a width of the first cover portion or a width of the second cover portion in the second direction is substantially equal to a maximum value of a width of the ceramic body in the second direction.

5. The multilayer ceramic capacitor of claim 1, wherein the first cover layer and the second cover layer comprise dielectric grains, and wherein an average particle diameter of the dielectric grains included in the second cover layer is greater than an average particle diameter of the dielectric grains included in the first cover layer.

6. The multilayer ceramic capacitor of claim 1, wherein the first cover layer and the second cover layer each comprise at least one selected from the group consisting of sodium (Na), lithium (Li), and boron (B), and wherein an amount of sodium (Na), lithium (Li), and/or boron (B) in the second cover layer is larger than an amount of sodium (Na), lithium (Li) and/or boron (B) in the first cover layer.

7. The multilayer ceramic capacitor of claim 1, wherein the first cover layer and the second cover layer each comprise magnesium (Mg), and wherein an amount of magnesium (Mg) in the first cover layer is larger than an amount of magnesium (Mg) in the second cover layer.

8. The multilayer ceramic capacitor of claim 1, wherein each of the first and second cover portions further comprises a third cover layer disposed on the second cover layer.

9. The multilayer ceramic capacitor of claim 8, wherein the third cover layer among the first to third cover layers has the highest average density.

10. The multilayer ceramic capacitor of claim 8, wherein the third cover layer comprises dielectric grains, and wherein the dielectric grains included in the third cover layer among the first to third cover layers have the largest average particle diameter.

11. The multilayer ceramic capacitor according to claim 1, wherein the first margin portion and the second margin portion each comprise a first margin layer adjacent to the first or second internal electrode and a second margin layer disposed on the first margin layer, and an interface at which the first margin layer and the second margin layer are in contact with each other.

12. The multilayer ceramic capacitor of claim 11, wherein a maximum thickness of the second margin layer is 30% to 70% of a maximum thickness of the first margin portion or the second margin portion.

13. The multilayer ceramic capacitor according to claim 1, wherein a maximum thickness of the second cover layer is 20% to 70% of a maximum thickness of the first cover portion or the second cover portion.

14. A multilayer ceramic capacitor comprising:

a ceramic body including a dielectric layer, and a first internal electrode and a second internal electrode, disposed to oppose each other with the dielectric layer interposed therebetween; and a first external electrode and a second external electrode disposed on two surfaces of the ceramic body opposing in a first direction and connected to the first and second internal electrodes, respectively, wherein the ceramic body further comprises:

a capacitance formation portion including the first and second internal electrodes, stacked in a third direction with the dielectric layer interposed therebetween, to form capacitance;

a first margin portion and a second margin portion disposed on both surfaces of the capacitance formation portion, respectively, in a second direction orthogonal to the first direction and to a third direction in which the first and second internal electrodes and the dielectric layer are stacked; and a first cover portion and a second cover portion, disposed on both surfaces of the capacitance formation portion, both surfaces of the first margin portion, and both surfaces of the second margin portion in the third direction, respectively, wherein the first and second cover portions each comprise two or more cover layers, stacked in the third direction and having a discrete surface between adjacent layers of the two or more cover layers, wherein the first and second cover portions each comprise a first cover layer adjacent to an internal electrode, disposed on an outermost side among the first and second internal electrodes, and immediately adjacent to the capacitance formation portion, a second cover layer disposed on the first cover layer, and wherein an average density of the second cover layer is higher than an average density of the first cover layer.

15. The multilayer ceramic capacitor of claim 14, wherein the both surfaces of the capacitance formation portion in the third direction are disposed on substantially the same plane as the both surfaces of the first margin portion and the both surfaces of the second margin portion in the third direction, respectively.

16. The multilayer ceramic capacitor of claim 14, wherein a maximum value of a width of the first cover portion or a width of the second cover portion in the second direction is substantially equal to a maximum value of a width of the ceramic body in the second direction.

17. The multilayer ceramic capacitor of claim 14, wherein the first cover layer and the second cover layer comprise dielectric grains, and wherein an average particle diameter of the dielectric grains included in the second cover layer is greater than an average particle diameter of the dielectric grains included in the first cover layer.

18. The multilayer ceramic capacitor of claim 14, wherein each of the first and second cover portions further comprises a third cover layer disposed on the second cover layer.

19. The multilayer ceramic capacitor of claim 18, wherein the third cover layer among the first to third cover layers has the highest average density.

20. The multilayer ceramic capacitor of claim 18, wherein the third cover layer comprises dielectric grains, and wherein the dielectric grains included in the third cover layer among the first to third cover layers have the largest average particle diameter.

21. The multilayer ceramic capacitor according to claim 14, wherein the first margin portion and the second margin portion each comprise a first margin layer adjacent to the first or second internal electrode and a second margin layer disposed on the first margin layer, and a discrete surface between the first margin layer and the second margin layer.

22. The multilayer ceramic capacitor of claim 21, wherein a maximum thickness of the second margin layer is 30% to 70% of a maximum thickness of the first margin portion or the second margin portion.

23. The multilayer ceramic capacitor according to claim 14, wherein a maximum thickness of the second cover layer is 20% to 70% of a maximum thickness of the first cover portion or the second cover portion.

* * * * *